United States Patent [19]

Liu

[11] Patent Number: 4,664,283

[45] Date of Patent: May 12, 1987

[54] USER ASSEMBLED DESK TOP FILE

[76] Inventor: Clark W. Liu, 9 Deerpath Dr., Vernon Hills, Ill. 60061

[21] Appl. No.: 901,325

[22] Filed: Aug. 28, 1986

Related U.S. Application Data

[63] Continuation-in-part of Ser. No. 793,248, Oct. 31, 1985, Pat. No. 4,625,879.

[51] Int. Cl.$^4$ .............................................. B65D 6/24
[52] U.S. Cl. ..................................... 220/4 F; 211/126
[58] Field of Search .................. 220/4 F, 72; 211/126

[56] References Cited

U.S. PATENT DOCUMENTS

| | | | |
|---|---|---|---|
| 1,656,497 | 1/1928 | Paulson | 220/4 F |
| 2,549,013 | 4/1951 | Rolles | 220/4 F |
| 3,081,897 | 3/1963 | Livingston | 220/4 F |
| 3,306,484 | 2/1967 | Padovani | 217/26.5 |
| 3,360,180 | 12/1967 | Venturi | 229/30 |
| 3,497,127 | 2/1970 | Box | 229/30 |
| 4,238,044 | 12/1980 | Roddier | 220/4 F |

Primary Examiner—George T. Hall

[57] ABSTRACT

An all-plastic desk top file or tray easily user assembled from planar panels that lock together with either snap-in integral barb or lateral tongue and slot connections without the use of any tools, and the tray is modular so trays can be stacked vertically and horizontally and locked together.

12 Claims, 22 Drawing Figures

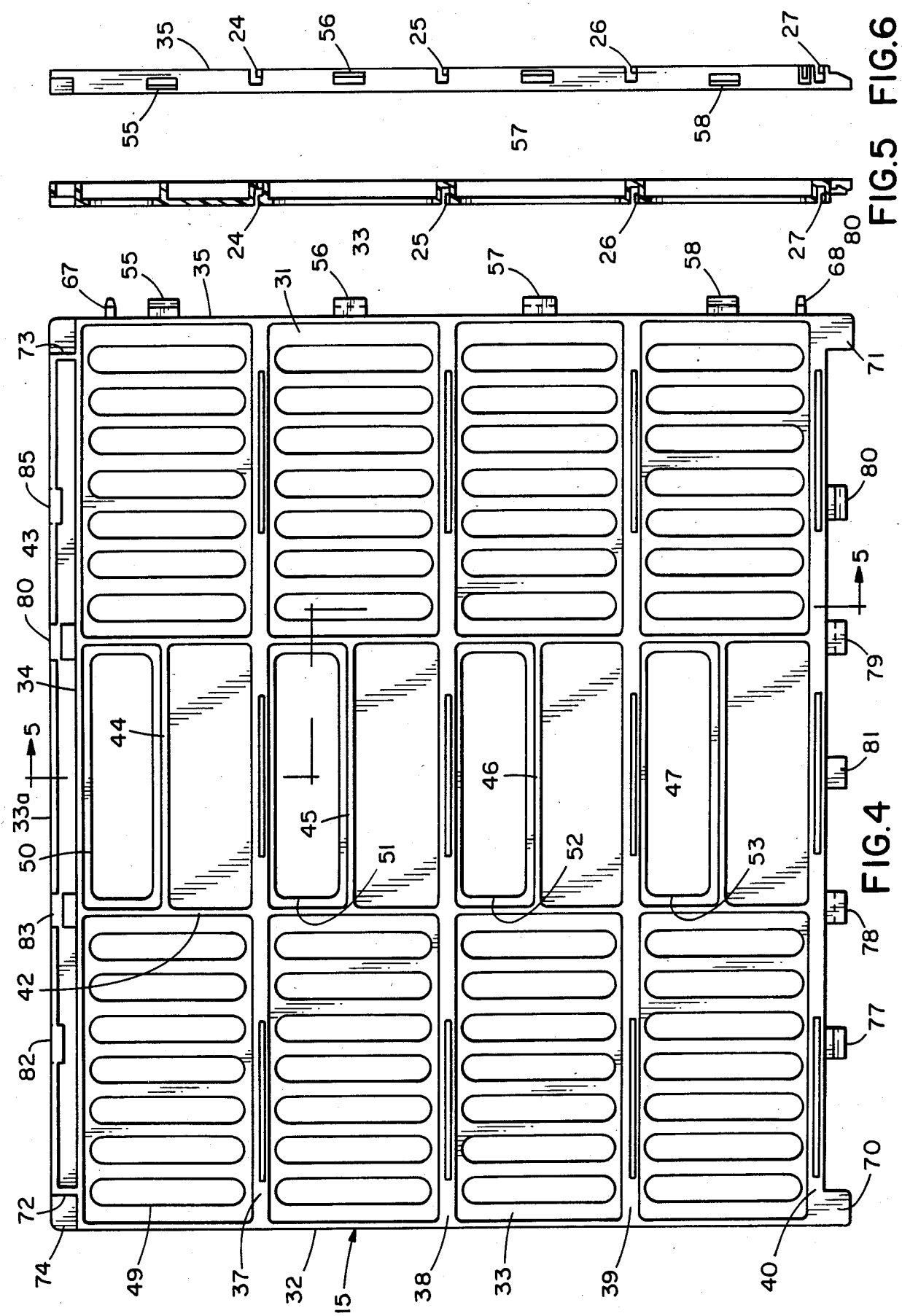

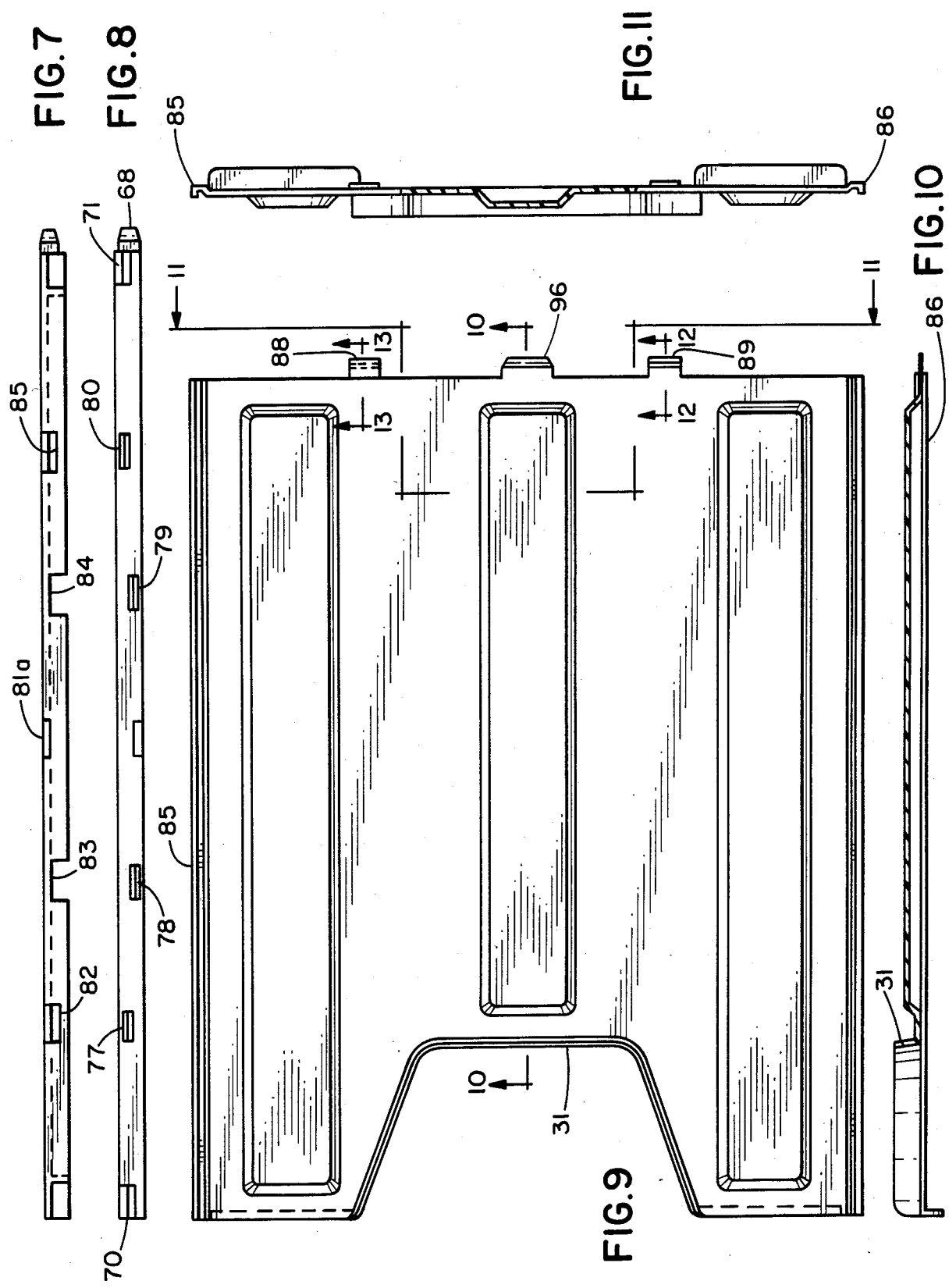

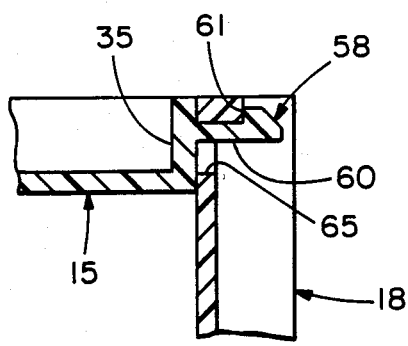
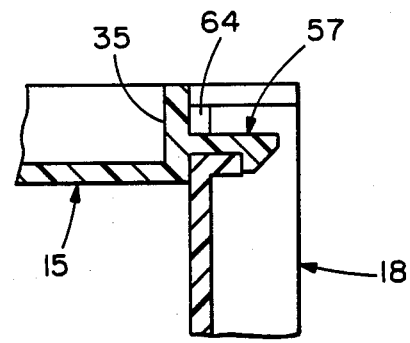
FIG.16  FIG.17
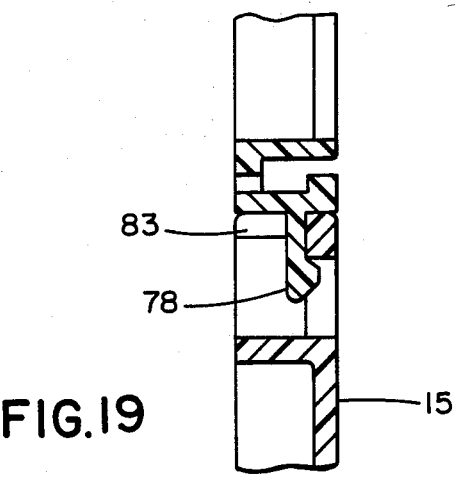
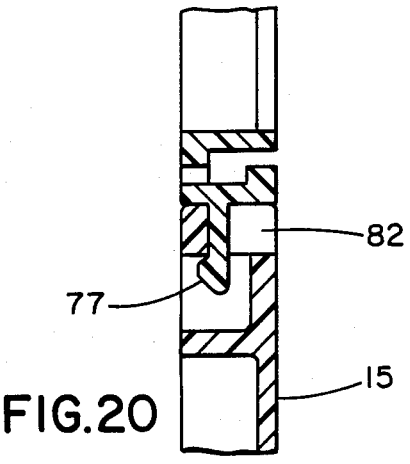
FIG.19  FIG.20
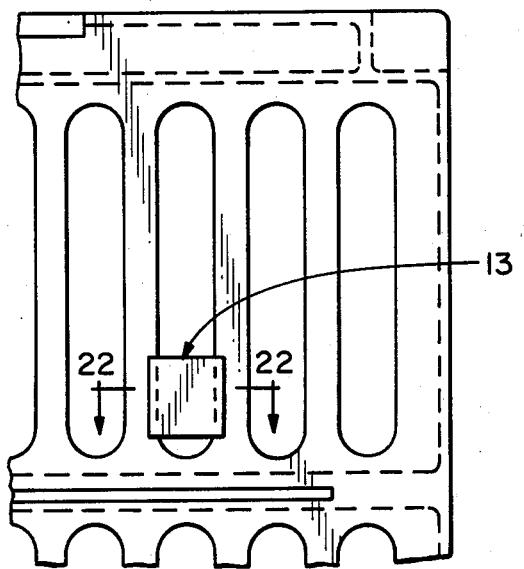
FIG.21
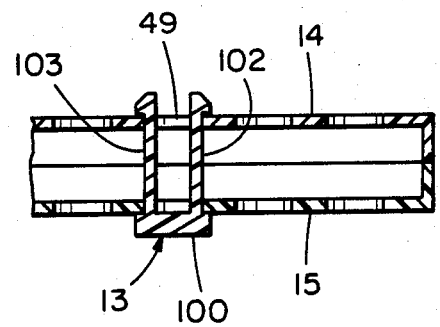
FIG.22

USER ASSEMBLED DESK TOP FILE

RELATED APPLICATION

This application is a continuation-in-part of my U.S. patent application Ser. No. 793,248, filed Oct. 31, 1985, now U.S. Pat. No. 4,625,879, entitled USER ASSEMBLED DESK TOP FILE.

BACKGROUND OF THE INVENTION

One-piece plastic desk or table top files or trays have achieved a significant amount of commercial success in the last several years because of their relatively low cost, space saving advantages and ease of use. One such product takes the form of a stackable tray horizontal file wherein each tray has integral top, bottom, rear and side walls.

These files or stands are injection moldings and because of their size require a very large mold and an injection molding machine large enough to inject the full volume of resin to complete the entire product. Such tooling is extremely costly because of its size and many small to medium size injection molding machines cannot be used to manufacture this product.

While these one-piece prior plastic files, even though in some cases multiple pieces when stacked, are relatively inexpensive, their product shipping containers are very large and therefore the shipping cost per part is inordinately high for a product in this low price category. A still further problem is that, as in all plastic parts, there are molding defects that result from shrinkage, inadequate injection pressure and other causes that produce part rejects, and since these products are made in one piece, a defect in part of the product requires that the entire product be rejected, further increasing product cost.

Although there are several stackable horizontal trays commercially produced, the only ones that stack and lock require additional parts to effect locking and those that do not lock frequently are unstable when stacked to a certain height.

All of these characteristics of prior desk top plastic files or trays contribute to the cost and desirability of the product and it is a primary objective of the present invention to ameliorate these cost-producing features without sacrificing any product utility.

SUMMARY OF THE PRESENT INVENTION

According to the present invention, an all-plastic desk top multi-shelf horizontal file or tray is provided that is easily user assembled from planar panels that lock together with either snap-in integral barb connectors or lateral tongue and slot connectors, both without the use of any tools. The file or stand is packaged and sold with the planar panels disassembled and stacked to minimize the size of the shipping container. Each of the planar panels is separately molded and because of their planar configuration, the overall mold cost and mold cycle times for all the individual panel molds are far less than for a single one-piece mold because of its large size and mold side action requirements. Furthermore, because the panels are molded generally as sheets, part distortion is reduced. Some of the panels are formed with downwardly projecting barbs that permit one-multi-shelf tray to be stacked and locked to an adjacent tray.

Toward these ends, and according to the exemplary embodiment of the product illustrated in this application, which is a multi-shelf horizontal tray, the tray includes a rear panel, vertical side panels and horizontal shelves. The side panels have L-shaped slots that slidably receive the shelf panels, which have lateral tongues that slide in the slots and lock the side panels thereto. The side panels also have a plurality of flexible barbs on one end thereof that snap into rectangular openings along the side edges of the rear panel. These barbs each have shoulders that stabilize the side panels on the rear panel.

Another important feature in the present invention as described in my parent application is that the L-shaped slots in the top and bottom panels (side panels in the present application) are formed in the mold without any movable core elements by forming part of the slot in the mold top plate and another part of the slot in the mold bottom plate. Basically this is achieved by forming the tongue or lateral portion of the slot in the bottom plate and the other portion of the slot in the mold top plate, except for spaced bridge portions that maintain panel rigidity.

Other objects and features of the present invention will become apparent from the detailed description of the invention.

It should be understood, however, that many of the principles of the present invention shown in a multi-shelf tray herein can also be applied to magazine files, "handy files", and the vertical files described in my parent application.

BRIEF DESCRIPTION OF THE DRAWINGS

FIG. 4 is a front view of the right side panel of the tray illustrated in FIG. 3 with the understanding that the left side panel is the mirror image of the right side panel;

FIG. 5 is a cross-section taken generally along line 5—5 of FIG. 4 illustrating the shelf slots in the side panels;

FIG. 6 is a right side view of the side panel illustrated in FIG. 4 showing the ends of the flexible barbs;

FIG. 7 is a top view of the side panel illustrated in FIG. 4;

FIG. 8 is a bottom view of the side panel illustrated in FIG. 4;

FIG. 9 is a top view of one of the shelves illustrated in FIGS. 1 and 3;

FIG. 10 is a right side view of the shelf illustrated in FIG. 9;

FIG. 11 is a partly fragmentary rear view of the shelf illustrated in FIG. 9;

FIGS. 16 and 17 are fragmentary sections taken generally along lines 16—16 and 17—17 of FIG. 3 illustrating the barb connections between the side panels and the rear panel;

FIGS. 19 and 20 are fragmentary sections generally taken along lines 19—19 and 20—20 of FIG. 18 illustrating the barb interconnections between the lower side of one tray and the upper side panels of another tray;

FIG. 21 is a fragmentary section of one of the side panels illustrating a horizontal connector for joining and locking adjacent trays, and;

FIG. 22 is a fragmentary section taken generally along line 22—22 showing the horizontal connector in position locking two side panels together.

DETAILED DESCRIPTION OF THE PREFERRED EMBODIMENT

Figure 1:
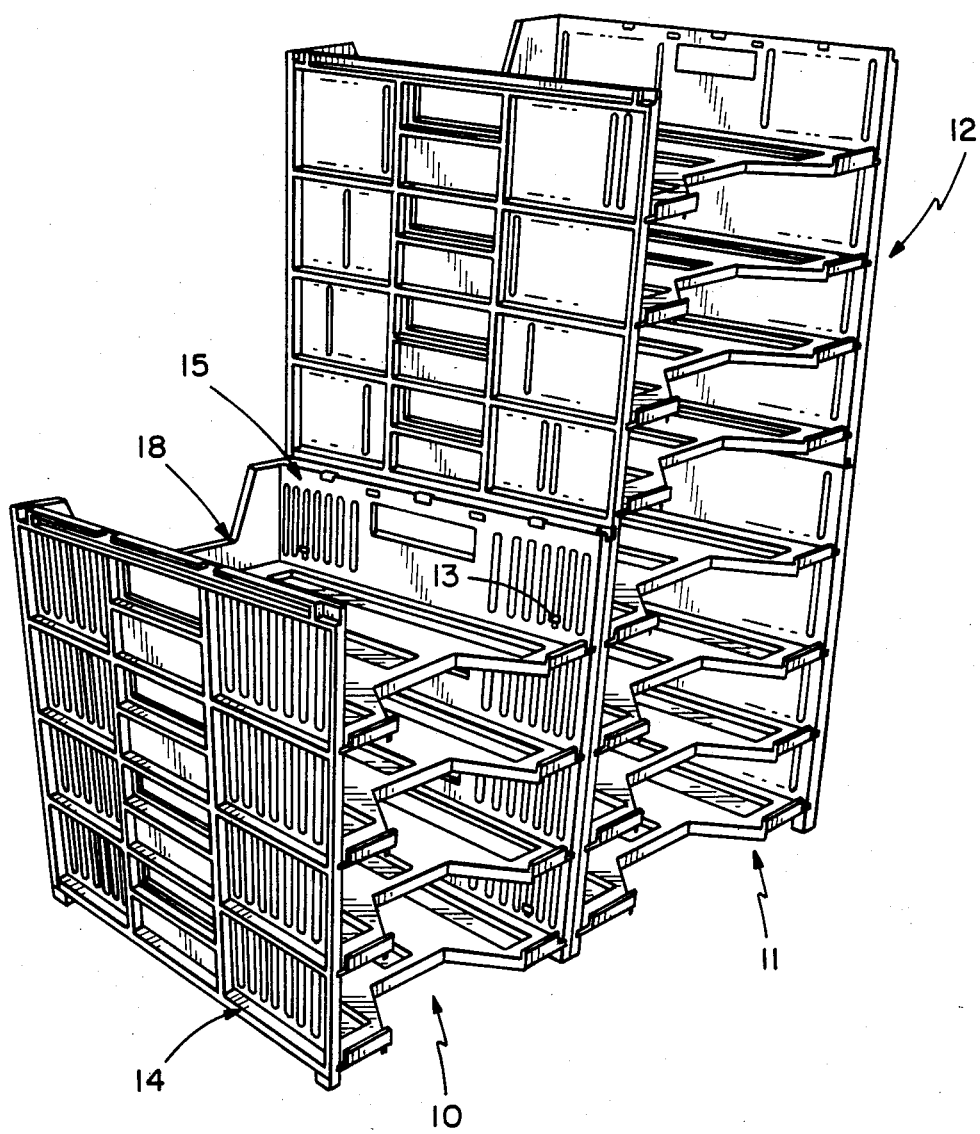
FIG. 1 is a perspective view of a modular system of multi-shelf trays according to the present invention vertically and horizontally locked together.

Referring to the drawings and particularly to FIG. 1, three multi-shelf horizontal trays 10, 11 and 12 are illustrated with tray 12 stacked vertically and locked on tray 11 and tray 10 horizontally attached to the side of tray 11 by a plurality snap clips 13. Any number of the multi-shelf trays according to the present invention may be stacked and locked both horizontally and vertically. Because each of the trays 10, 11 and 12 itself has a plurality of shelves and each has high structural integrity, it is possible to provide an increased number of vertical shelves in any single column of shelves compared to present day single shelf trays.

Figure 2:
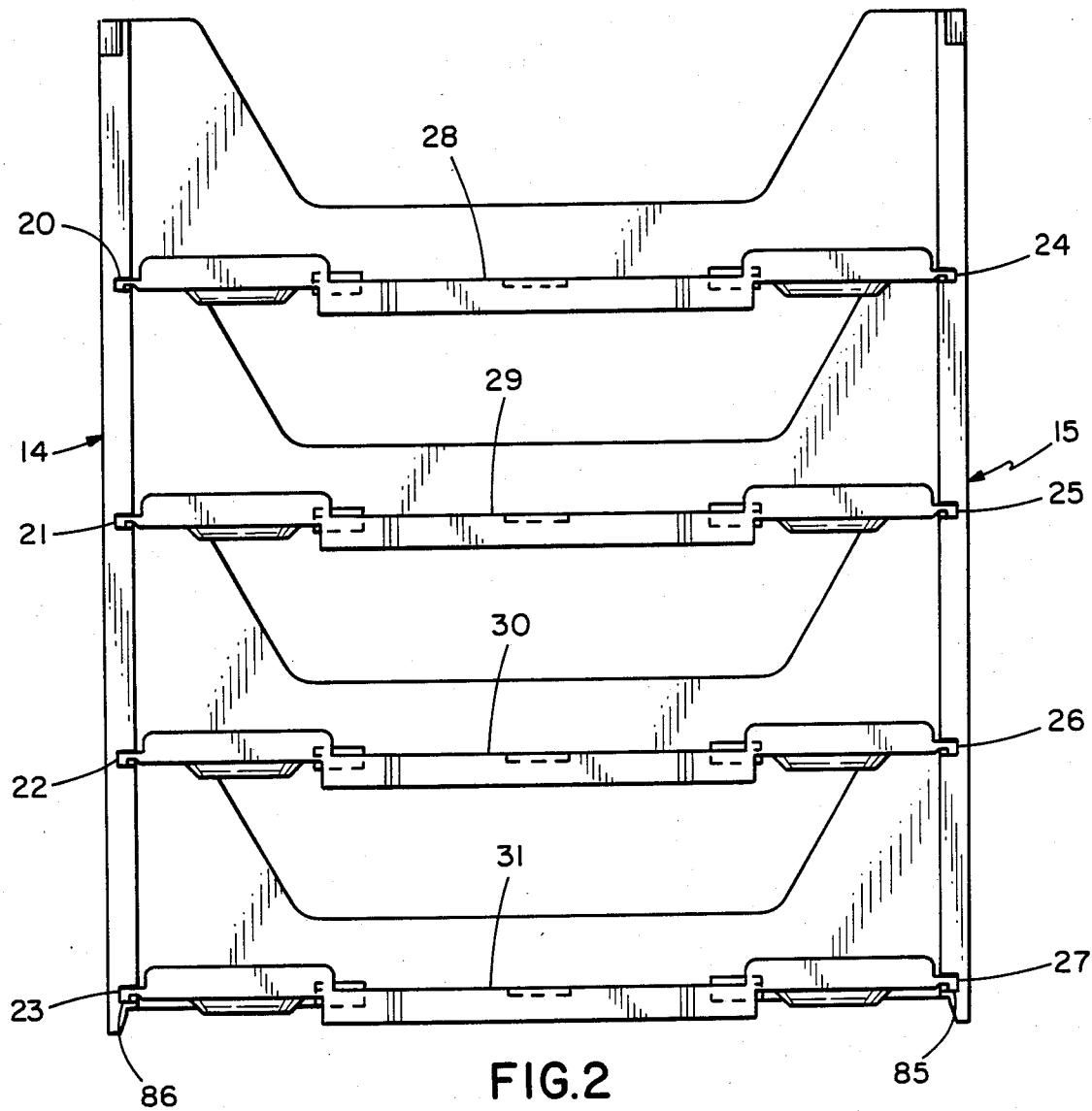
FIG. 2 is a front view of one of the multi-shelf trays illustrated in FIG. 1.
Figure 18:
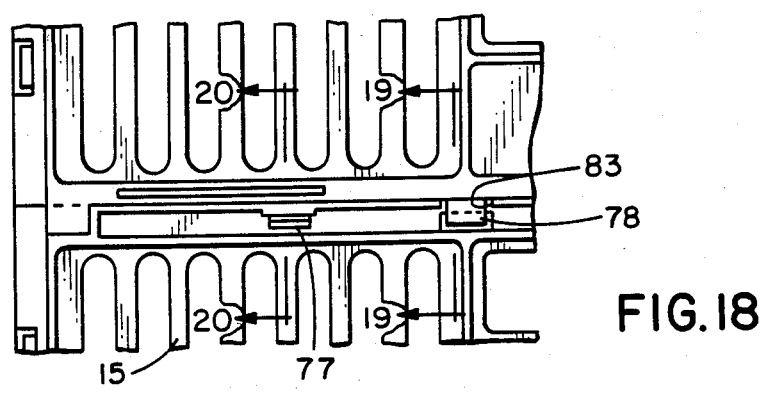
FIG. 18 is a fragmentary view of the lower side of one tray stacked and locked to the upper side of another tray.
Figure 3:
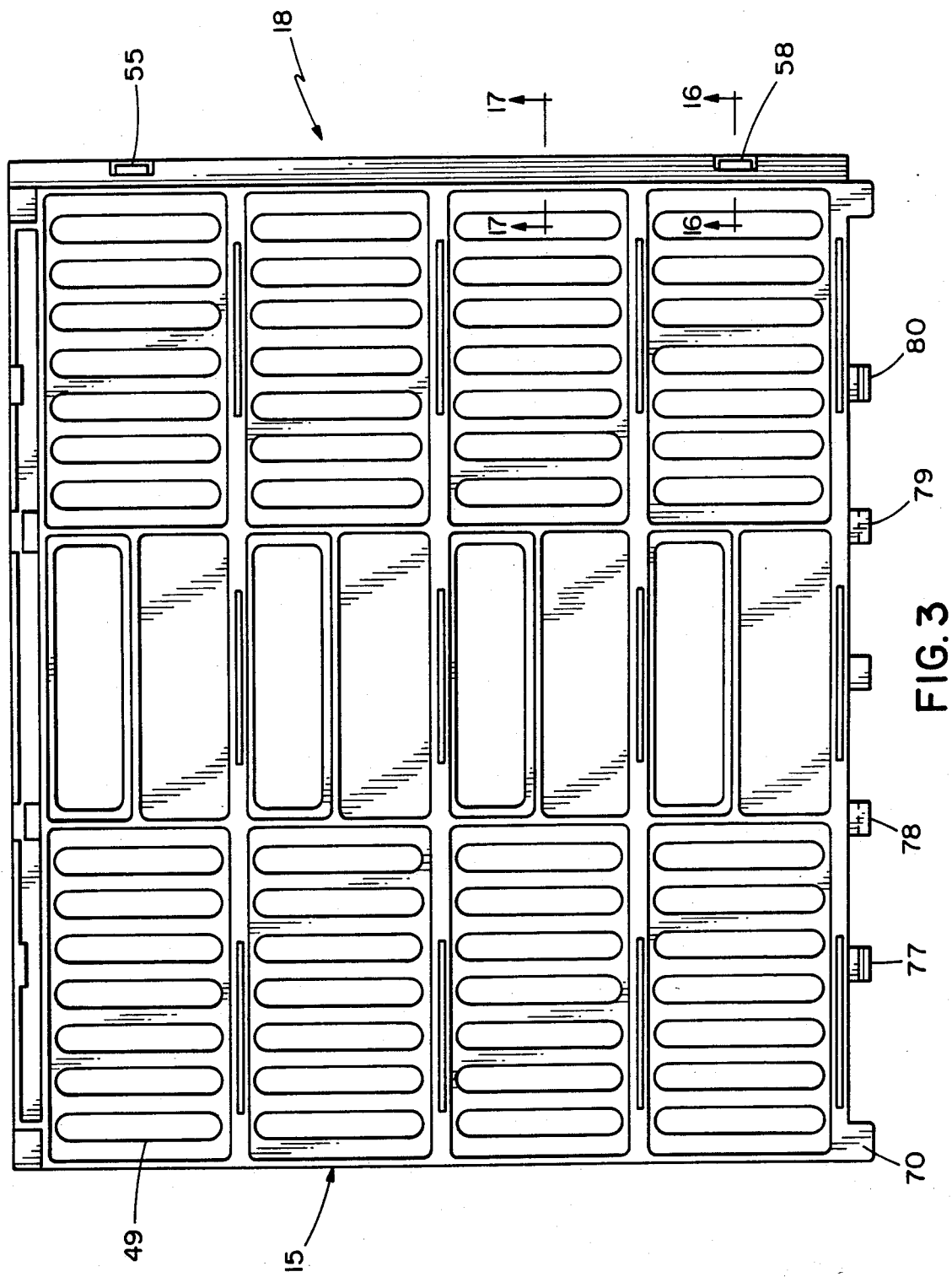
FIG. 3 is side view of one of the multi-shelf trays illustrated in FIG. 3.
Figure 12:
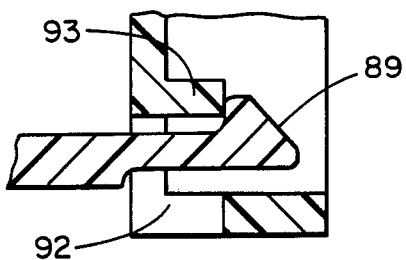
FIGS. 12 and 13 are fragmentary sections taken generally along lines 12—12 and 13—13 of FIG. 10 except that the shelf is assembled to the rear panel, illustrating the shelf barbs engaging the rear panel apertures.
Figure 13:
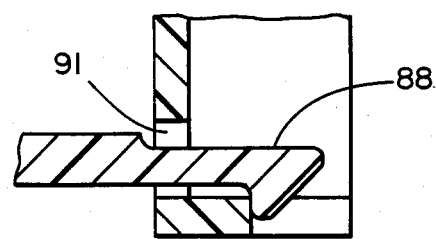
Figures 14, 15:
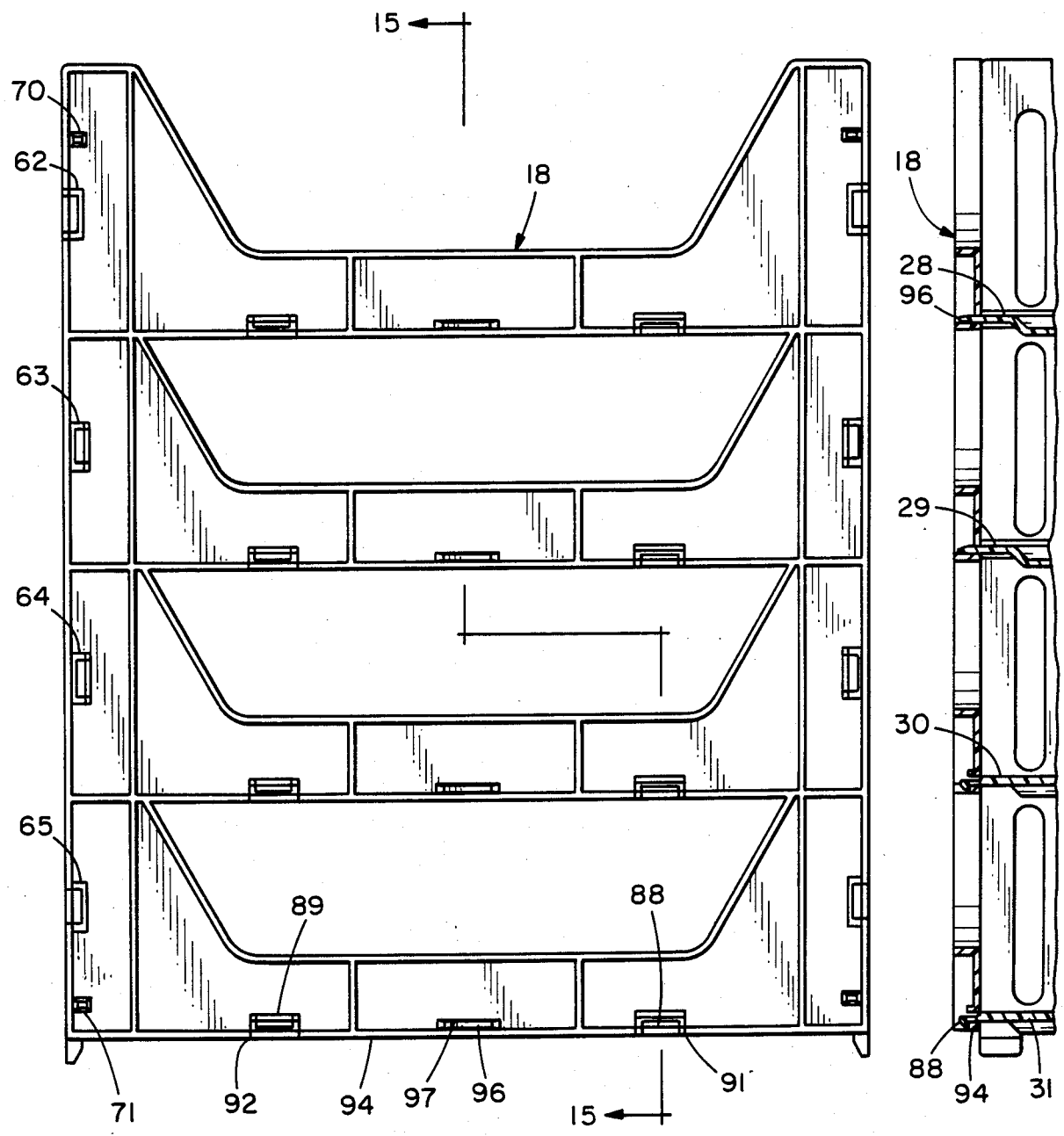
FIG. 14 is a rear view of the multi-shelf tray illustrated in FIGS. 1, 2 and 3.
FIG. 15 is a fragmentary cross-section taken generally along line 15—15 of FIG. 14 illustrating the interconnections between the shelves and the rear panel.

As each of the trays 10, 11 and 12 is identical, further reference will be made to tray 10 for a more detailed description of the tray. As seen in FIGS. 1 to 3, tray 10 generally includes a left side panel 14 and a parallel opposed right side panel 15 interconnected together by a rear panel 18. The side panels 14 and 15 as seen in FIG. 2 have slots 20, 21, 22, 23, 24, 25, 26 and 27 that slidably receive four identical shelves 28, 29, 30 and 31 and that lock on the rear panel 18.

The right side panel 15 is illustrated in FIGS. 3, 4, 5, 6, 7 and 8 and it should be understood that the left side panel 14 is the mirror image of the right side panel so the description of panel 15 applies to side panel 14 as well. Panel 15 is generally planar in configuration and includes an inner wall 33 from which peripheral rims 32, 33a, 34, and 35 project with interconnecting horizontal ribs 37, 38, 39 and 40, the latter of which define the shelf slots 24, 25, 26 and 27. The shelf slots 24, 25, 26 and 27 are "L" shaped in configuration to lock the shelves 28, 29, 30 and 31 in position and are formed by a unique method described in detail with respect my parent application Ser. No. 793,248 and the specification thereof is hereby incorporated herein by reference.

Two additional vertical ribs 42 and 43 and horizontal ribs 44, 45, 46 and 47 are provided for added rigidity to the panel 15. A plurality vertical slots 49 are formed in wall 33 to reduce material and provide aesthetics for the panel and a plurality of horizontal slots 51, 52 and 53 are also provided in wall 33 for the same purpose and additionally the latter horizontal slots can be used for hand grasping the tray for movement thereof.

There are four flexible barbs 55, 56, 57 and 58 that project rearwardly from side panel peripheral rib 35 as seen in FIGS. 4, 6, 16 and 17. Viewing particularly FIGS. 6, 16 and 17, the barbs 55, 56, 57 and 58 are staggered along rib 35 and each is seen to include a flexible shank portion 60 and a locking shoulder 61. Adjacent ones of the barbs face in opposite directions as seen in FIG. 6 with barbs 55 and 58 facing outwardly and barbs 56 and 57 facing inwardly.

The barbs 55, 56, 57 and 58 fit and lock in rectangular apertures 62, 63, 64 and 65 formed in the rear panel 18. As seen in FIGS. 16 and 17 which depict adjacent barbs 58 and 57, respectively, the offset and oppositely facing arrangement of adjacent barbs cause one barb to force the adjacent barb into locking engagement. Note that each of the barbs flexes in a direction perpendicular to its associated panel 15.

Referring to FIG. 4, alignment tabs 67 and 68 also project rearwardly from side panel rib 35 and fit into aligned apertures 70 and 71 in rear panel 18.

Because tab 68 is closer to the bottom of panel 15 than tab 67 is to the top, the side panels are polarized so it is not possible for the user to insert right side panel 15 into apertures on the left side of the rear panel 18 mistaking it for the left panel.

Thus, barbs 55, 56, 57 and 58 define snap lock connections with the apertures 62, 63, 64 and 65 in the rear panel 18.

The side panels 14 and 15 also have downwardly projecting integral generally retangular feet 70 and 71 at the forward and rear ends thereof that are adapted to support the tray 10 on a flat supporting surface. Top ribs 33a and 34 and short vertical ribs 72 and 73 form rectangular recesses 74 and 75 at the top of the side panels to receive the feet 70 and 71 when the trays are stacked and assist in holding the stacked trays in position. To further guide and lock the trays together when stacked, there are provided a plurality of downwardly projecting flexible barbs 77, 78, 79 and 80 from lower rib 40 that snap lock in a plurality rectangular openings 82, 83, 84 and 85 in the uppermost horizontal rib 33. Barbs 77, 78, 79 and 80 are staggered as seen in FIG. 8 with barbs 77 and 80 facing outwardly and barbs 78 and 79 facing inwardly so adjacent barbs lock in opposite directions as seen FIGS. 19 and 20 in a manner similar to the rearwardly projecting barbs 55, 56, 57 and 58 interconnecting the side panels to the rear panel 18. Note that feet 70 and 71 are longer than barbs 77 to 80 to prevent contact of the barbs with the supporting surface.

Veiwing FIGS. 10, 11, 12, 13, 14 and 15, each shelf 28, 29, 30 and 31 is identical so that the following description with respect to shelf 31 should be understood to apply to the other shelves as well. Shelf 31 is also generally planar in configuration and has "L" shaped side flanges 85 and 86 that are slidably received in the "L" shaped slots 23 and 27 in side panels 14 and 15 as seen in FIG. 2. A pair of flexible barbs 88 and 89 extend rearwardly from the shelf 31, face in opposite directions and are adapted to snap in and lock in rectangular openings or recesses 91 and 92 in the rear panel 18. Barb 89 locks onto a tab 93 adjacent opening 92 while barb 89 locks on a cutout in rear wall lower rib 94. Each shelf has a tapered guide tab 96 extending centrally and rearwardly thereof that fits into a rectangular slot 97 centrally in the rear panel 18 to serve as the pilot pin for the assembly engagement and to assist in supporting the shelf in the rear panel.

One tray is locked to another tray horizontally by a clip 13 as seen in FIGS. 1, 21 and 22 that fits through aligned slots 49 in adjacent tray walls 14 and 15 of adjacent trays 10 and 11. The clip 13 is seen to include base 100 with outwardly projecting flexible barbs 101 and 102 that have a length such that barbs 102 and 103 lock onto the adjacent panel 14 without any significant play.

I claim:

1. A generally rectangular panel plastic container wherein the panels are molded separately and thereafter assembled together without the use of any tools, and wherein the container may be constructed to be positioned in a variety of orientations, comprising: first and second opposed parallel panels interconnected at one end by a third panel, first manually activated integral snap-locking devices interconnecting the first and third panels and the second and third panels, at least two integral parallel locking slots integrally formed in the first and second panels with the slots in the first panel being aligned with the slots in the second panel, fourth and fifth panels slidably positioned in the aligned slots in the first and second panels and having locking slides slidable in the locking slots, manually activated integral snap-locking devices interconnecting the fourth and third panels and the fifth and third panels, said snap-locking devices including a plurality of apertures in the third panel aligned with each of the first and second panels, and a plurality of flexible barbs on each of the first and second panels adapted lock in the aligned apertures in the third panel, the barbs on each of the first and second panels being flexible out of the plane of the connected panel.

2. A generally rectangular panel plastic container as defined in claim 1, wherein adjacent ones of the barbs on each of the first and second panels extend perpendicular to the panel and face in opposite directions so that one barb biases the adjacent barb into locking engagements with the aligned aperture in the third panel.

3. A generally rectangular panel plastic container as defined in claim 1, wherein the locking slots in the first and second panels have an "L" shaped cross-section and the locking slides on the fourth and fifth panels have a cooperating "L" shaped projection slidable in the "L" shaped locking slots.

4. A generally rectangular panel plastic container as defined in claim 1, wherein the locking slots are formed by a first slot extending only part way through one panel from one side thereof, a second slot laterally offset from but connecting with the first slot extending only part way through the one panel from the other side thereof, said second slot having spaced bridge portions to provide rigidity to the one panel, and a plurality of third slots extending only part way through the one panel from said one side aligned with the second slot and positioned only over the bridge portions to complete the "L" shaped configuration of the locking slots.

5. A generally rectangular panel plastic container wherein the panels are molded separately and thereafter assembled together without the use of any tools, and wherein the container may be constructed to be positioned in a variety of orientations, comprising: first and second opposed parallel panels interconnected at one end by a third panel, and fourth and fifth opposed panels each attached to and orthogonally related to the first, second and third panels, said third panel having a plurality of small rectangular apertures extending along the edges thereof adjacent the first and second panels, said first and second panels having a plurality of flexible barbs integrally molded thereon with each set being insertable into one of the rectangular apertures in the third panel, each of said barbs being offset from the associated apertures of that they snap into the apertures, said barbs being flexible in a direction perpendicular to the associated first and second panels, adjacent ones of the barbs facing in opposite directions.

6. A modular assembly of multi-shelf trays: comprising, a first modular tray having first and second spaced parallel side panels interconnected by a rear third panel, a plurality of shelves extending between the first and second panels and connected to the third panel, a second modular tray having first and second spaced parallel side panels interconnected by a rear third panel, a plurality of shelves extending between the second tray first and second panels and connected to the second tray third panel, each of the first and second modular tray side panels having a plurality of apertures in an upper portion thereof and a plurality of flexible barbs in a lower portion thereof adapted snap-lock in the apertures in the other tray to vertically stack and lock the modular trays together.

7. A modular assembly of multi-shelf trays as defined in claim 6, including means to hold the first and second trays together horizontally, said means including a clip with flexible locking barbs.

8. A modular assemlby of multi-shelf trays as defined in claim 6, wherein the flexible barbs extend downwardly from the side panels, adjacent ones of the barbs facing in opposite directions perpendicular to the plane of the associated side panel.

9. A modular assembly of multi-shelf trays as defined in claim 8, including a plurality of feet extending downwardly from each of the side panels having a length greater than the barbs so that the barbs do not touch the support surface when that tray is the lowermost tray in a vertical stack, and a plurality of apertures in the upper portion of the side panels for receiving the feet of a stacked tray.

10. A generally rectangular panel plastic container wherein the panels are molded separately and thereafter assembled together without the use of any tools, and wherin the container may be constructed to be positioned in a variety of orientations, comprising: first and second opposed parallel panels interconnected at one end by a third panel, first manually activated integral snap-locking devices interconnecting the first and third panels and the second and third panels, at least two integral parallel locking slots integrally formed in the first and second panels with the slots in the first panel being aligned with the slots in the second panel, fourth and fifth panels slidably positioned in the aligned slots in the first and second panels and having locking slides slidable in the locking slots, manually activated integral snap-locking devices interconnecting the fourth and third panels and the fifth and third panels, said snap-locking devices including a plurality of apertures in the third panel aligned with each of the first and second panels, and a plurality of flexible barbs on each of the first and second panels adapted to lock in the aligned apertures in the third panel, the barbs on each of the first and second panels being flexible out of the plane of the connected panel, said first and second panels having a plurality of downwardly projecting flexible barbs and a plurality of barb receiving apertures in an upper portion thereof defining snap locking interconnections, whereby the container may be vertically stacked on an identical container.

11. A generally rectangular panel plastic container as defined in claim 10, a plurality of feet extending downwardly from each of the side panels having a length greater than the barbs so that the barbs do not engage the support surface when that container is the lowermost container in a vertical stack, and a plurality of apertures in the upper portion of the side panels for receiving the feet of a stacked container.

12. A generally rectangular panel plastic container wherein the panels are molded separately and thereafter assembled together without the use of any tools, and wherein the container may be constructed to be positioned in a variety of orientations, comprising: first and second opposed parallel panels interconnected at one end by a third panel, first manually activated integral snap-locking devices interconnecting the first and third panels and the second and third panels, at least two integral parallel locking slots integrally formed in the first and second panels with the slots in the first panel being aligned with the slots in the second panel, fourth and fifth panels slidably positioned in the aligned slots in the first and second panels and having locking slides slidable in the locking slots, manually activated integral snap-locking devices interconnecting the fourth and third panels and the fifth and third panels, said snap-locking devices including a plurality of apertures in the third panel aligned with each of the first and second panels, and a plurality of flexible barbs on each of the first and second panels adapted to lock in the aligned apertures in the third panel, the barbs on each of the first and second panels being flexible out of the plane of the connected panel, said snap locking devices interconnecting the fourth and third panels and the fifth and third panels including a plurality of flexible barbs on each of the fourth and fifth panels and a plurality of aligned receiving apertures in the third panel, said barbs being flexible in a direction perpendicular to the associated panel and adjacent ones of the barbs facing in opposite directions.

* * * * *